United States Patent
Kato

(10) Patent No.: US 8,841,504 B2
(45) Date of Patent: Sep. 23, 2014

(54) METHOD FOR DISPOSAL OF RADIOACTIVE WASTE

(71) Applicant: Daigo Kato, Tokyo (JP)

(72) Inventor: Masatoshi Kato, Nakatsugawsa (JP)

(73) Assignees: Daigo Kato, Tokyo (JP); Masatomo Kato, Seto-shi (JP)

( * ) Notice: Subject to any disclaimer, the term of this patent is extended or adjusted under 35 U.S.C. 154(b) by 0 days.

(21) Appl. No.: 14/003,922

(22) PCT Filed: May 24, 2013

(86) PCT No.: PCT/JP2013/064432
§ 371 (c)(1),
(2), (4) Date: Sep. 9, 2013

(87) PCT Pub. No.: WO2014/024542
PCT Pub. Date: Feb. 13, 2014

(65) Prior Publication Data
US 2014/0066685 A1    Mar. 6, 2014

(30) Foreign Application Priority Data

Aug. 10, 2012 (JP) ................................. 2012-178519

(51) Int. Cl.
*G21F 1/00* (2006.01)
*G21F 9/30* (2006.01)
*G21F 5/005* (2006.01)
*G21F 1/06* (2006.01)
*G21F 1/02* (2006.01)

(52) U.S. Cl.
CPC ...... *G21F 9/305* (2013.01); *G21F 9/30* (2013.01); *G21F 5/005* (2013.01); *G21F 1/06* (2013.01); *G21F 1/02* (2013.01)

USPC .............................................. 588/16; 588/412

(58) Field of Classification Search
USPC .......................... 588/16, 2, 11, 313, 410, 412
See application file for complete search history.

(56) References Cited

FOREIGN PATENT DOCUMENTS

| JP | 60-111195 A | 6/1985 |
|---|---|---|
| JP | 07-225299 A | 8/1995 |
| JP | 2006-132976 A | 5/2006 |
| JP | 2012-504773 A | 2/2012 |
| JP | 2012-504774 A | 2/2012 |
| WO | WO-2010/042416 A2 | 4/2010 |
| WO | WO-2010/042417 A2 | 4/2010 |

OTHER PUBLICATIONS

International Search Report dated Jul. 2, 2013, issued for PCT/JP2013/064432.

*Primary Examiner* — Edward Johnson
(74) *Attorney, Agent, or Firm* — Edwards Wildman Palmer LLP

(57) ABSTRACT

Provided is a method for disposal of radioactive waste which can reduce the radiation level until the waste can be reused as landfill or the like and which prevents the leakage of radiation nuclides in the ground. The method includes the following: a primary treatment step of turning the radioactive waste into a radioactive waste (primary treated waste) which has a radiation level equal to or less than a reference value via a radiation shielding agent composed of or predominantly composed of a Ca-based inorganic compound; and a secondary treatment step of heating to melt the primary treated waste and thereafter cooling the same to glass granules, and then sealing radioactive nuclides in the glass body.

20 Claims, 3 Drawing Sheets

METHOD FOR DISPOSAL OF RADIOACTIVE WASTE

TECHNICAL FIELD

The present invention relates to a method for disposal of radioactive waste. More specifically, the invention relates to the disposal of intermediate and low level radioactive waste (especially, contaminated soil) that is generated at the time of a nuclear power plant accident around a nuclear power plant such as the Fukushima nuclear power plant accident.

In the following descriptions, the amount of an additive (mixture) will be measured in units of mass unless otherwise specified.

BACKGROUND ART

When a nuclear power plant accident like the one mentioned above occurs, a large quantity of contaminated soil (intermediate and low level radioactive waste) may be found on houses, schools, agricultural land, and forest roads in an area 20 to 30 km around the nuclear power plant.

Since the Fukushima nuclear power plant accident, there has been a stronger need than ever before for a method for disposal of radioactive waste which enables a large quantity of intermediate and low level radioactive waste to be safely transported and stored and which enables final disposal of waste after the radiation level is reduced to a natural radiation level or national predetermined reference value (e.g., ICRP recommendation: a yearly radiation dose of 20 mSv).

The fission product 137Cs (55) contained in radioactive waste is turned by the β decay into 137Ba (56) which emits gamma rays. In this regard, Cs has a half-life of 30.17 years, thus requiring a long-term storage. Furthermore, the gamma rays emitted from 137Ba (56) themselves have an exceptionally high transmittance when compared with other α rays or β rays. Typically, as a shield for gamma rays, heavy concrete (having a specific gravity of 3.5 to 4.3; up to 2.3 for ordinary concrete) which has aggregates of iron ore and iron scrap in concrete have been used (see Encyclopaedia Chimica Editing Committee (ed.) (Jul. 31, 1962) "Encyclopaedia Chimica 8", p.617, Kyoritsu Shuppan). However, the storage container or capsule that employs the heavy concrete as a shield increases in weight, and thus had problems in transportation and storage. Furthermore, the concrete is fundamentally porous, thus completely preventing leakage of radioactive nuclides is difficult. Thus, radioactive nuclides had to be covered with a closely packed shield or buried deep in the ground, making it difficult to ensure storage sites or the like.

In this context, the development of a method for disposal of radioactive waste has been desired, the method enabling the intermediate and low level radioactive waste to be reduced in radiation level until the waste can be reused as landfill or the like and preventing the leakage of radiation nuclides in the ground.

However, the inventors of the prevent invention have not heard of known techniques for such a method for disposal of radioactive waste.

Although having no effects on the patentability of the present invention, the following prior art documents exist.

Disclosed in Patent Documents 1 and 2 is "a radioactive waste storage container (radiation shielding structure) composed of constituents including calcium silicate and magnesium oxide, or oxidation calcium and acid phosphate."

Disclosed in Patent Document 3 is "a radioactive waste disposal container characterized by including: a body material wall constituting skeleton of the container; a corrosion-resistant barrier material wall for covering the outer surface of the body material wall so as to prevent the same from an external corrosive environment; and an insulating material wall which is assembled between the body material wall and the corrosion-resistant barrier material wall and which electrically insulates between the body material wall and the corrosion-resistant barrier material wall.

CITATION LIST

Patent Literature

Patent Literature 1: JP-2012-504774A
Patent Literature 2: JP-2012-504773 A
Patent Literature 3: JP-2006-132976 A

SUMMARY OF INVENTION

In view of the aforementioned problems, it is an object of the present invention to provide a method for disposal of radioactive waste which is capable of reducing the radiation dose of radioactive waste down to a reference value at which the radioactive waste can be readily handled and the storage site is not strictly limited particularly, the method being further capable of reducing the radiation dose to a level at which the waste is reusable as final disposal site landfill and preventing the leakage of radiation nuclides in the ground.

Solution to Problem

In the course of intensive studies and development to solve the aforementioned problems, the inventors have reached the idea of the present invention adapted as stated below on the basis of the findings that a primary treatment step adapted as stated below enables the radiation level to be reduced to a predetermined value or less and allows storage and transportation, and a secondary treatment step adapted as stated below enables the radiation level to be reduced to a level at which the waste can be buried in the ground and also enables the leakage of most of the radiation nuclides in the ground to be prevented.

A method for disposal of intermediate and low level radioactive waste, the method including: a primary treatment step of turning the radioactive waste into a radioactive waste (hereafter referred to as the "primary treated waste") which has a radiation level equal to or less than a reference value via a shielding agent composed of or predominantly composed of a Ca-based inorganic compound; and a secondary treatment step of heating to melt the primary treated waste and thereafter cooling the same to glass granules, and then sealing radioactive nuclides in the glass granules, the method being characterized in that in the secondary treatment step, the primary treated waste to which a fusing agent (melting point depressant) and/or glass powder having an upper slow cooling temperature of 550° C. or less is added is heated and melted at a temperature setting in the range from 750 to 1050° C.

Advantageous Effects of Invention

The primary treatment step is capable of reducing the radiation level of the radioactive waste to a reference value or less, thereby facilitating transportation to storage. Furthermore, the secondary treatment step (glass granule forming step) implements glass granule forming by melting and cooling the primary treated waste at a temperature setting of 750 to 1050° C., thereby making it possible to seal most of the radioactive nuclides Cs in a body of glass granules. That is, in the secondary treatment step, the melting temperature of 750 to 1050° C. is lower by 200° C. or more than the boiling point of the radioactive nuclides Cs (the lowest 1250° C. (CsF)). It is thus possible to seal most of the radioactive nuclides Cs in the glass without being vaporized. At this time, low melting temperatures decrease productivity; but radioactive nuclides Cs in the secondary treatment step can be prevented with reliability from being emitted into the atmosphere, thus eliminating the need for a special radioactive nuclide capturing facility.

DETAILED DESCRIPTION OF THE PREFERRED EMBODIMENTS

Figure 1:
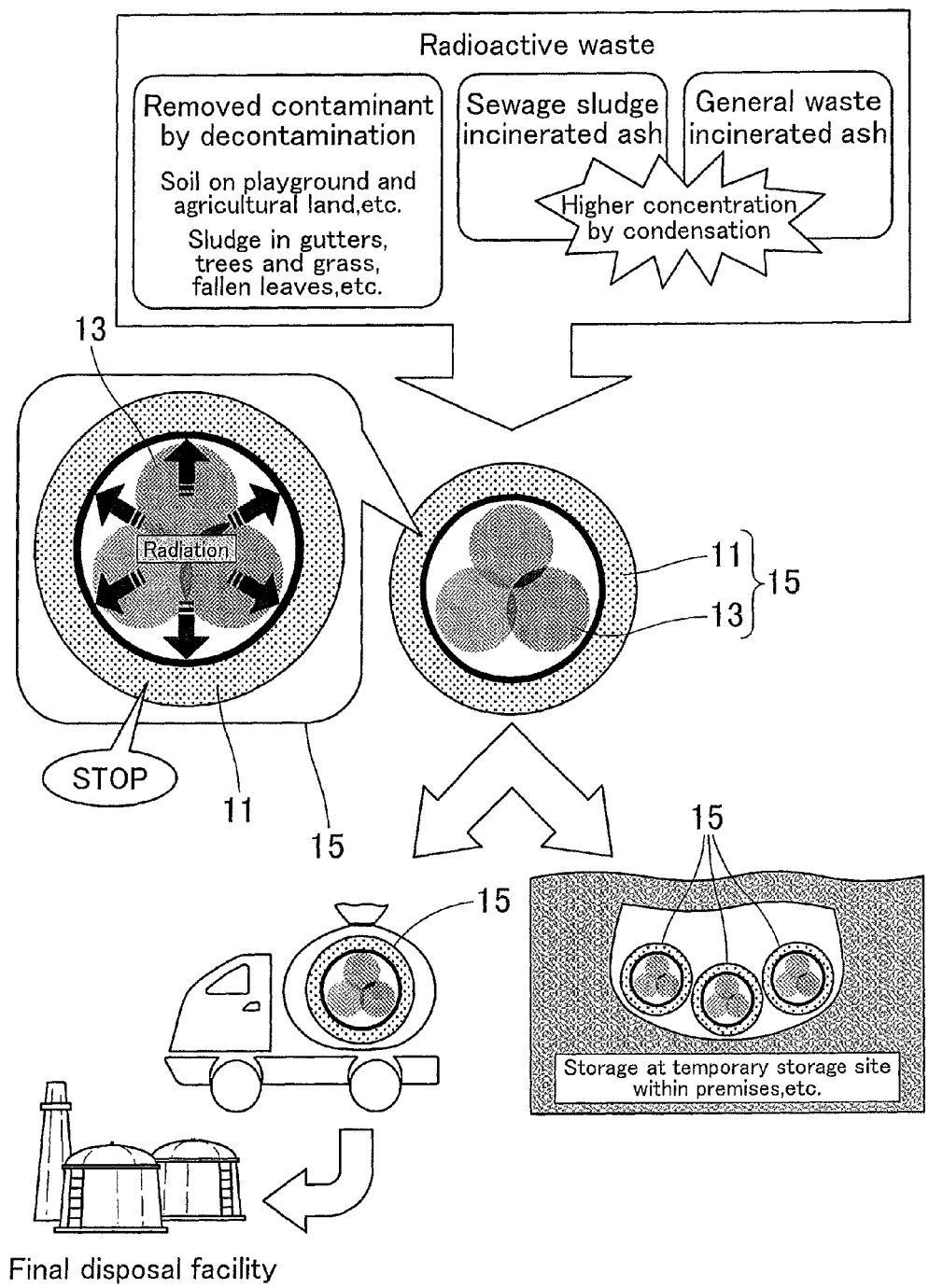
FIG. 1 is a model diagram showing a primary disposal method for radioactive waste according to the present invention.
Figure 2:
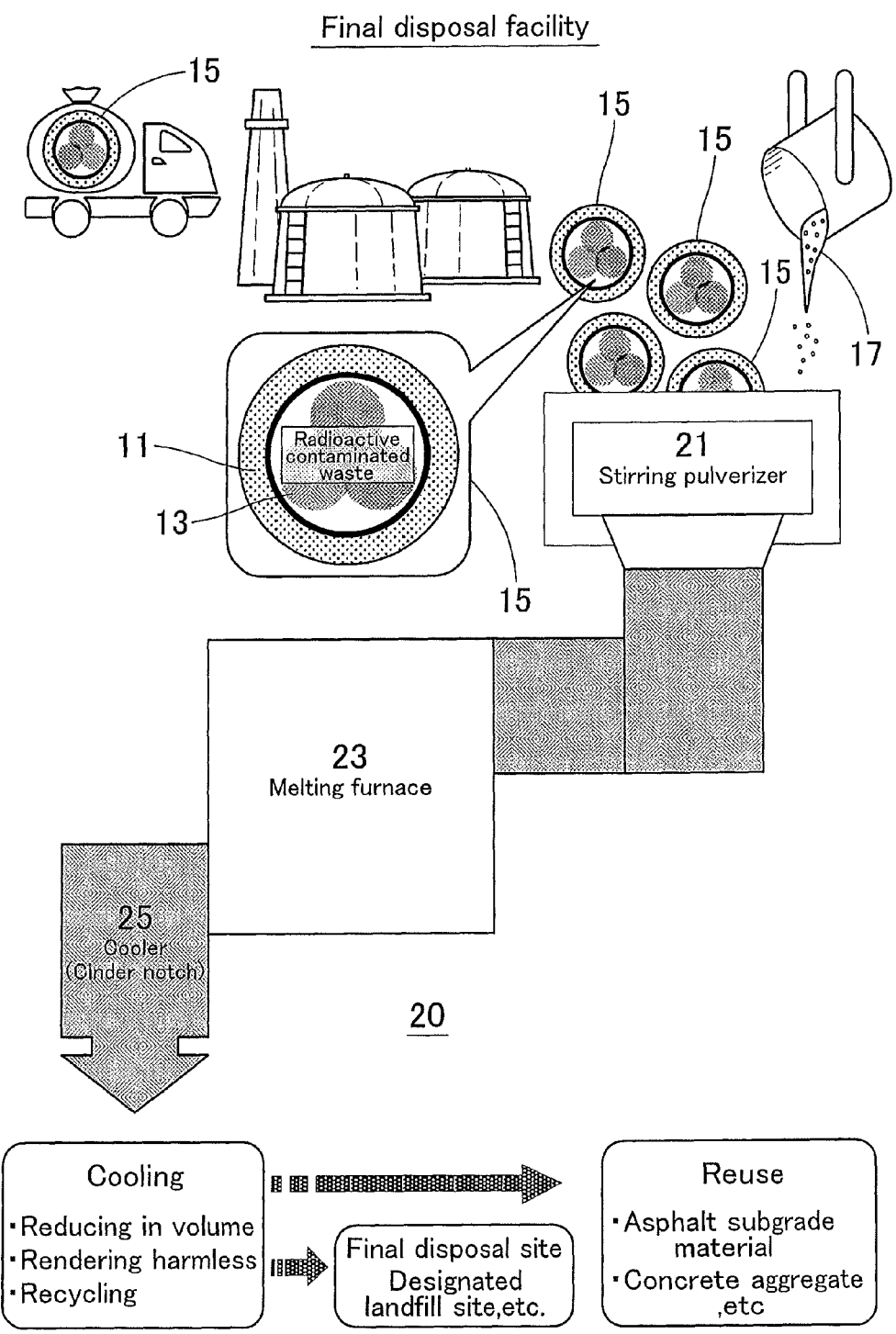
FIG. 2 is a model diagram showing a secondary disposal method according to the present invention.

Now, description will be made to the present invention with reference to FIGS. 1 and 2.

(1) A primary treatment step: radioactive waste is turned with a radiation shielding agent (hereafter referred to as "the shielding agent") into a radioactive waste having a radiation level that is equal to or less than a reference value (hereafter referred to as a "primary treated waste").

As used herein, the radioactive waste is defined to have a intermediate and low radiation level (0.1 to 1 mSv/h). The radioactive waste may include, for example, removed contaminants by decontamination that are generated from radioactive decontamination areas designated due to a nuclear power plant accident, sewage sludge incinerated ash, and general waste incinerated ash. The removed contaminants by decontamination may include, for example, soil on playgrounds and agricultural land, sludge in gutters, trees and grasses, and fallen leaves.

The aforementioned shielding agent to be employed may be a Ca-based inorganic compound, that is, one composed of Ca salt and/or Ca oxide. The Ca salt may preferably be (a) discarded pulverized seashells mentioned below, and the Ca oxide may be (b) Ca-based inorganic binders mentioned below.

(a) Discarded pulverized seashells (seashell powder obtained by burning and pulverizing seashells): seashells may include, for example, scallops, oysters, and clams. These seashells are industrial waste that is generated in large quantities by the food industry. Thus, the seashells will contribute to effective use of industrial waste.

(b) Ca-based inorganic binders, which may include, for example, lime (CaO, hydrated lime ($Ca(OH)_2$, magnesium lime), gypsum ($CaSO_4 \cdot 2H_2O$, burnt plaster ($CaSO_4$), anhydrite plaster), and alumina cement ($(CaO)_x \cdot (Al_2O_3)_y$). These raw materials are available at low costs.

(c) Non-Ca-based binders: [organic type] natural polymer (such as polynucleotide, polypeptide, polysaccharide, and gum arabic), nonionic polymer (such as polyacrylamide, polyacrylic acid, polyethylene oxide, polyvinyl alcohol, and poly N-Vinyl-pyrrolidone); [inorganic type] water glass and the like.

Then, the radioactive waste (such as contaminated soil) and a shielding agent containing a binder are kneaded with water added thereto and thereafter solidified to yield a primary treated waste (hereafter the "primary treated waste single type") 13, which has a radiation level equal to or less than a reference value. Here, the primary treated waste single type is not limited to a particular form, and can be a block (compact) or granule body.

Furthermore, the ratio between the radioactive waste and the Ca-based inorganic compound of the shielding agent (the (a) component and the (b) component) is set, as appropriate, depending on the radiation level of the radioactive waste. Typically, the ratio is set as appropriate in the range of the radioactive waste/the Ca-based inorganic compound=1/9 to 5/5 (preferably, 2/8 to 4/6). The ratio between the radiation shielding agent and the radioactive waste is limited to those of the Ca-based component because non-Ca-based binders have almost no radiation shielding effects (effects of reducing the radiation level).

Furthermore, with respect to a total 100 parts of the radioactive waste and the Ca-based inorganic compound of the shielding agent, the amount of water added is 50 to 100 parts. This varies depending on the moisture content of the radioactive waste and the type of the Ca-based inorganic compound.

The primary treated waste single type 13 is typically charged into a storage container 11. Here, the storage container 11 is desirably a radiation shielded container (hereafter referred to as the "shielded container") formed by kneading a shielding agent (discarded seashells component +a binder) with water. This is to doubly shield the radioactive waste. In this case, the waste is of a primary treated waste complex type (I) (the primary treated waste single type+the shielded container). The primary treated waste complex type (I) can be readily adapted to a radioactive waste of a relatively high radiation level among intermediate and low level radioactive waste. The primary treated waste complex type may be obtained by covering the primary treated waste single type or the radioactive waste with a radiation shield, to which a kneaded product of the shielding agent with water is solidified, in place of the shielded container.

Furthermore, if the radioactive waste is not in a bulky form, not a kneadable powdery, mud-like, or chip-like form, required pre-processing, for example, pulverization or incineration is performed.

If the pulverization or incineration may possibly cause radioactive nuclides (especially, Cs) to be emitted into the atmosphere via dust particles or ash particles, the radioactive waste is directly stored in a radiation shielded container 11 or covered with a radiation shield. That is, the radioactive waste is turned into the primary treated waste complex type (II) (the radiation shield+the radioactive waste).

The radiation shielded container 11 is to be made up of a container body (cylindrical type, box type) and a lid assembly, each having a predetermined thickness. The container body and the lid assembly may be preferably obtained by kneading the shielding agent with water added thereto and then molding the resulting mixture. The thickness varies depending on the radiation level of the radioactive waste to be charged and the required capacity. For example, for the storage container 11 having a size of a drum (with a capacity of 200 L), an appropriate value may be selected from the range of thicknesses of 50 to 100 mm (preferably, 80 mm or greater). In the case of an insufficient strength, iron bars or iron nets are buried.

As described later, the shielded container 11 can also be molded from a mixture of a shielding agent and a radioactive waste (such as contaminated soil) kneadable with the shielding agent, the radioactive waste measuring about ½ or less in total composition.

The primary treated waste complex type 15 that is formed by charging a primary treated waste single type 13 into the radiation shielded container 11 or by charging the radioactive waste into the radiation shielded container 11 is transported to a local temporary storage site, an intermediate storage facility, or a final disposal facility. At this time, the level of radiation from the radiation shielded container 11 is equal to or less than a reference value at which the waste can be handled, thus allowing the waste to be transported and stored at each site or facility without requiring high-level radiation protective measures.

When the primary treated waste single type (aggregate-shaped waste) has a low radiation level, the waste may be charged into a general-purpose storage container, for example, an iron drum or plastic container and then stored at a temporary storage site within the premises.

(2) The aforementioned primary treated waste single type and complex type (I) and (II) are heated to melt and then cooled to a glass body in a waste melting disposer 20 as follows.

At this time, typically, a fusing agent (freezing point depressant) and/or glass powder of an upper slow cooling temperature of 550° C. or less is added to the waste. This is to heat and melt the waste at 1050° C. or less. The fusing agents may include, for example, boric acid, borax, or frit. The fusing agent may be added in advance to the shielding agent.

The aforementioned glass of an upper slow cooling temperature of 550° C. or less may be borosilicate glass of 518 to 550° C., soda lime glass of 472 to 523° C., and lead glass of 419 to 451° C. (cited from Encyclopaedia Chimica Editing Committee (ed.) (Jul. 31, 1962) "Encyclopaedia Chimica 9", p. 858, Kyoritsu Shuppan). The glass powder can be obtained by pulverizing glass waste (especially, waste such as TV cathode-ray tubes or window glass). Thus, this contributes to effective use of industrial waste. When the aforementioned glass waste is lead glass like TV cathode-ray tube glass or soda lime glass like window glass, effects of increasing the radiation shielding capacity can be preferably expected.

Silica glass powder has high slow cooling temperatures of 910 to 1140° C. for silica glass and is composed of only silica. Thus, each of the effects of decreasing the freezing point and increasing the radiation shielding cannot be expected; however, the silica glass powder, which is a waste, can be used as an extending agent.

Furthermore, the amount of fusing agent and glass powder added to 100 parts of primary treated waste (the radioactive waste+the shielding agent) varies depending on the melting temperature setting, the composition of the shielding agent, and the type of the fusing agent or the glass powder. Typically, an appropriate value is chosen from the range of 15 to 300 parts.

The waste melting disposer 20 is made up of a stir pulverize step unit (stirring pulverizer 21), a melting step unit (a melting furnace 23), and a cooling step unit (a cooler 25).

Here, for example, the stirring pulverizer 21 can be any of a screw type or propeller type. That is, it is sufficient as long as it has a capability of pulverizing the storage container composed of the Ca-based shielding agent.

The melting furnace 23 can be, for example, of any of a burner type or electric furnace type. That is, the melting furnace 23 may serve sufficiently as long as it has a capacity of turning the primary treated waste single type and complex type into molten glass (at 750 to 1050° C.).

Furthermore, the cooler 25 is provided with a heat exchanger, an air cooling means, or a water cooling means.

Now, description will be made to a secondary disposal method for the primary treated waste (single type and complex type) using the waste melting disposer 20 mentioned above.

The primary treated waste is charged into the stir pulverize unit, and then a fusing agent and/or glass powder of an upper slow cooling temperature of 550° C. or less is added thereto so as to stir and pulverize the primary treated waste. At this time, typically, the waste is preferably pulverized to medium sizes from 1 to 10 mm.

Then, the stirred and pulverized waste is charged into a melting furnace so as to be heated and melted at a temperature setting within the range of 750 to 1050° C. The temperature setting is preferably lower from the viewpoint of preventing radioactive nuclides Cs from being emitted into the atmosphere, but is preferably higher from the viewpoint of shortening the processing time of the melting treatment (productivity). To keep the balance between the two, the temperature setting may be preferably 800 to 1000° C. Also, the melting treatment time is, for example, about two hours at 800° C. and about one hour at 1000° C.

Also, when a temperature setting is less than 750° C., it is difficult to melt the waste into a glass body even if the fusing agent or glass powder is added thereto, causing the treatment time for heating and melting to be elongated thus degrading productivity.

Then, the molten waste is cooled to be glass granules. The cooling method may be performed either slowly or rapidly depending on the type of the binder and the size required for the glass granules. The slow cooling may tend to lead to relatively large granules, while providing a low glass rate (density). The rapid cooling may tend to be difficult to obtain large granules, while providing a high glass rate (density). Unlike a hydrate hardened product such as cement, the glass body is so dense so that radioactive nuclides (Cs) are sealed (encapsulated) almost perfectly, allowing little possibility of leakage of radioactive nuclides. Here, the glass granules are typically produced by dropping (rapidly cooling) molten waste into water. The typical size thereof at this time is 0.1 to 5 mm.

For the fusing agent or powder glass not containing the radiation shielding component (Ca or Pb), the secondary treated waste (glass granules) has the same radiation dose as that of the primary treated waste, but has been turned into a glass body, thus having no possibility of leakage of the radioactive nuclides from the secondary treated waste. Thus, regardless of place, the secondary treated waste can serve as landfill material and can be used as asphalt subgrade material or concrete aggregate. Furthermore, for the fusing agent or the powder glass containing the radiation shielding component (Ca or Pb), further increased effects of shielding radiation can be expected. That is, the radiation dose of the secondary treated waste can be reduced.

When the radiation dose of the secondary treated waste has not reached a final disposal reference at which disposal is allowed, the shielding agent (Ca-based inorganic compound) or glass powder having a shielding capacity is added again to the secondary treated waste by one to two times the previous amount and then turned into the glass granules in the same manner as above. This step of forming glass granules is repeated until the radiation dose reaches the final disposal reference value.

When the primary treated waste single type has been stored in a storage container such as the aforementioned iron container, only the primary treated waste single type 13 is charged into the stirring pulverizer 21 of the waste melting disposer 20.

TEST EXAMPLE I

This test example compares the radiation shielding capacities of each radiation shield.

Prepared were plate-shaped radiation shields with each having a thickness of 60 mm and sides of 100 mm.

The material of the present invention: 20 parts of binder (gum arabic) was added and then 70 parts of water was further added to 100 parts of calcined scallop shells (condition: 1000° C.×60 min) and pulverized material (median diameter: 0.1 μm) so as to be kneaded and formed into the plate-shaped material as specified above.

Concrete material: 150 parts of water was added to 100 parts of constituent of cement/sand=1/2 so as to be kneaded and formed into the plate-shaped material as specified above.

Lead plate: a commercially available lead plate was cut so as to be stacked one by one, and thereby the plate-shaped material was prepared as specified above.

Then, the contaminated soil collected at Namie-machi in Fukushima prefecture that is located within the 20 to 30 km range of the Fukushima nuclear power plant was charged into a petri dish (having an inner volume of 1000 cc). Then, the aforementioned each plate-shaped shield place on top of the petri dish was measured three times for the radiation dose. Measurements were also made in the same manner on the petri dish with no shield placed on the top thereof. A radiation meter ("RADIATION ALERT Inspector" (trade mark) (available from Sowa Trading Co., Ltd.) was used.

TABLE 1

| Shield | Not Available | Seashell Powder Compact | Lead Plate | Concrete |
|---|---|---|---|---|
| Radiation Dose | 3.8 μSv/h | 0.42 μSv/h | 0.28 μSv/h | 0.53 μSv/h |
| Shielding Rate (%) | 0.0 | 88.9 | 92.6 | 86.0 |

From Table 1 indicating the aforementioned results (arithmetic average values), it was confirmed that the compact (radiation shield) with seashell powder employed as the shielding agent has a higher shielding effect than the concrete. This is due to a high CaO component content. Thus, the compact of only gypsum or lime can provide the effects of the present invention. Furthermore, the waste that has been heated to melt and then cooled into glass granules can be expected to increase effects of shielding radiation and preventing leakage of radioactive nuclides by the glass body made denser.

TEST EXAMPLE II

For the contaminated soil to be mixed with a radiation shielding agent, a mixing ratio that makes a radiation shield (container) available was studied. It was confirmed that a high radiation shielding rate was achieved when the entire composition ratio of the contaminated soil was about 1/2 or less, preferably about 1/3 or less.

Used as the contaminated soil (radioactive waste) was the sewage sludge incinerated ash from a sewage sludge disposal site at a city in Kanto area. The shielding component (shielding agent): the one having the same composition as that of the present invention was used.

Figure 3:
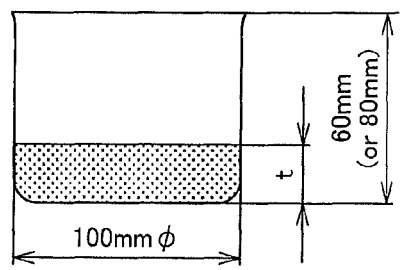
FIG. 3 is a cross-sectional view illustrating a beaker used for a test to check the effect of reducing the radiation dose and the shielding effects in test example II.

Then, the shielding component and the contaminated soil were each weighed and prepared at the ratio shown in Table 2 and then charged into a beaker (see FIG. 3). After that, 60 g of water was added to a total amount of 100 g of the mixture (90 g for 150 g). Subsequently, after kneading, the mixture was left until it was solidified so as to prepare a radiation shield (plate-shaped compact) that is a primary treated waste single type.

The thus prepared radiation shield (samples a and b) or the contaminated soil compact (sample c) was measured for the radiation dose for 5 minutes by the radiation meter set at the opening surface of the beaker. From Table 2 indicating the results, it can be seen that composition of the contaminated soil being ½ to ⅓ or less in the entire amount, the radiation dose of the contaminated soil (compact) is reduced by 20 to 40%.

TABLE 2

| | Sample a | Sample b | Sample c |
|---|---|---|---|
| Shielded Component/Contaminated Soil | 50 g/50 g | 100 g/50 g | 0 g/100 g |
| Thickness (t) | 13 mm | 20 mm | 20 mm |
| (Shielded) Compact Radiation Dose (μSv/h) | 0.263-0.213 | 0.236-0.137 | 0.347-0.257 |
| Reduction Rate (%) | 75-82 | 68-53 | — |

Next, to check the shielding effect of each radiation shield prepared in this manner, the contaminated soil (radioactive waste) was placed on the lower surface of each beaker in which the radiation shield is held, so that the radiation dose was measured on the upper surface of the beaker (at a distance of 60 mm from the radioactive waste) in the same manner as above. From Table 3 indicating the results, it was confirmed that the radiation shield of the present invention prepared by mixing the contaminated soil exhibits a radiation shielding rate of 93 to 95%.

TABLE 3

| | Sample a | Sample b | Radioactive Waste |
|---|---|---|---|
| Thickness (t) | 13 mm | 20 mm | — |
| Radiation Dose Measurement Position | 60 mm from the Upper Surface of Radiation Waste | 60 mm from the Upper Surface of Radiation Waste | 60 mm from the Upper Surface of Radiation Waste |
| Measured Radiation Dose (μSv/h) | 18.93-17.95 | 13.1-11.1 | 270.1-248.7 |
| Shielding Rate (%) | 93.0-92.8 | 95.5-95.2 | — |

Next, three beakers (FIG. 3), each having a height of 800 mm×a diameter of 100 mm, were prepared, and sample a and sample b were each charged into a beaker, and a mixture of 250 g with the shielding agent/the contaminated soil=2/1 was charged into the remaining beaker so as to prepare the radiation shield (of a thickness of 33 mm) b' in the same manner.

Then, the contaminated soil (radioactive waste) was placed on the lower surface of each beaker which held the radiation shield, and the radiation meter was placed on the upper surface to measure the radiation dose. From Table 4 indicating the results, it was confirmed that an increase in thickness lead to a further increase in shielding rate of 93 to 98%.

TABLE 4

|  | Sample a + Sample b | Sample b' | Radioactive Waste |
|---|---|---|---|
| Thickness (t) | 13 mm + 20 mm = 33 mm | 33 mm | — |
| Measurement Position | 80 mm from the Upper Surface of Radiation Waste | 80 mm from the Upper Surface of Radiation Waste | 80 mm from the Upper Surface of Radiation Waste |
| Measurement Dose (μSV/h) | 14.6-16.8 | 5.57-5.13 | 249.3-240.9 |
| Shielding Rate (%) | 93-95 | 97-98 | — |

Figure 4:
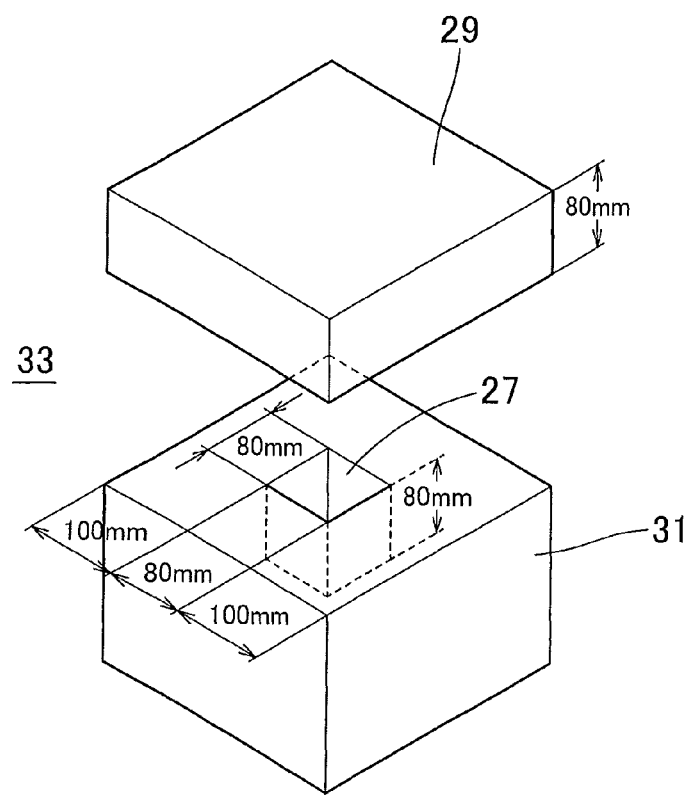
FIG. 4 is a perspective view illustrating a radiation shielded container formed in the test example II.

Finally, a formwork was used to form a shielded container (radiation shield) 33l which includes a storage hole 27 (side lengths of 80 cm×a depth of 80 cm) for the radioactive waste shown in FIG. 4 and which is made up of a cubic container body 31 and a lid assembly 29. At this time, the composition and the kneading and solidifying of the shielding agent was the same as those of the present invention. Then, the radioactive waste was charged into the radioactive waste storage hole 27 of the storage container 33, and the radiation dose at the opening of the storage hole 27 before being closed with the lid assembly 31 and the radiation dose after being closed with the lid assembly 31 were measured.

From Table 5 indicating the results, it was confirmed that the radiation shielded container 33 predominantly composed of the shielding agent had a thickness of 90 mm showing a radiation shielding rate of 99% or greater. It was also confirmed that the measured radiation dose at that time was about 1 μSv/h (8.76 mSv/y) and thus reduced below the reference value 20 μSv of the yearly radiation dose, so that the radiation level was reduced to such a level that allows the resulting waste to be brought into or taken out of a temporary storage site.

TABLE 5

|  | Lid | Sidewall | Radiation Waste |
|---|---|---|---|
| Shielding Compact (μSV/h) | 0.197-0.133 | 0.197-0.133 | — |
| Radiation Dose Thickness (t) | 90 mm | 100 mm | — |
| Measured Radiation Dose (μSV/h) | 1.162-1.042 | 0.559-0.419 | 558.9-532.6 |
| Shielding Rate (%) | 99.79-99.8 | 99.89-99.92 | — |

As described above, the aforementioned radiation shielded container 33 having a thickness of 90 to 100 mm can store and retain the radioactive waste (contaminated substance). That is, the radiation shielded container 33 can be used as the aforementioned storage container 11 allowing safe storage in a temporary storage site (intermediate storage site).

TEST EXAMPLE III

The primary treated waste single type having the same composition as that of sample b (the shielding component/the contaminated soil=2/1) in Table 2 above was hammered into intermediate pulverized material of a size of 1 to 2 cm. Then prepared was the waste to be disposed that was obtained by adding 1 kg of lead glass powder (TV cathode-ray tube pulverized material) and 1 kg of boric acid were added to 1 kg of the intermediate pulverized material (the primary treated waste). The waste to be disposed was charged into a heating and melting furnace ("KYN-6N" by KYOEI ELECTRIC KILNS CO., LTD., Specifications: 200V and 6 kW, maximum service temperature of 1300° C.) and then heated and melted for two hours at a temperature setting of 800° C., thereafter allowed to flow into water (at room temperature). In this manner, provided was glass granules of 1 to 2 mm (the secondary treated waste). The volume of the secondary treated waste was about ⅓ the volume of the waste to be disposed. The surface radiation dose of the secondary treated waste was about 80% of the surface radiation dose of the primary treated waste. That is, it was confirmed that the lead glass powder added had an effect (of reducing the radiation dose and increasing the radiation shielding rate).

EXPLANATION OF SYMBOLS

11 Radioactive waste storage container (radiation shielded container)
13 Primary treated waste single type
15 Primary treated waste complex type
20 Waste melting disposer
21 Stirring pulverizer
23 Melting furnace
25 Cooler (Cinder notch)

What is claimed is:

1. A method for disposal of intermediate and low level radioactive waste, the method comprising:
a primary treatment step of turning the radioactive waste into a radioactive waste (hereafter referred to as the "primary treated waste") which has a radiation level equal to or less than a reference value via a radiation shielding agent composed of or predominantly composed of a Ca-based inorganic compound; and a secondary treatment step of heating to melt the primary treated waste and thereafter cool the same to glass granules, and then sealing radioactive nuclides in the glass nuclides, the method being characterized in that in the secondary treatment step, the primary treated waste to which a fusing agent and/or glass powder having an upper slow cooling temperature of 550° C. or less is added is heated and melted at 750 to 1050° C.

2. The method for disposal of radioactive waste according to claim 1, characterized in that the radiation shielding agent is composed of discarded pulverized seashells and a binder.

3. The method for disposal of radioactive waste according to claim 2, characterized in that the binder is a Ca-based inorganic compound.

4. The method for disposal of radioactive waste according to claim 1, characterized in that the fusing agent is boric acid, borax, or frit.

5. The method for disposal of radioactive waste according to claim 1, characterized in that the glass powder is composed of lead glass or soda lime glass.

6. The method for disposal of radioactive waste according to claim 1, characterized in that the primary treated waste is of a primary treated waste single type obtained by kneading the radiation shielding agent and a radioactive waste kneadable with the radiation shielding agent with water added thereto, and thereafter by solidifying the resulting mixture.

7. The method for disposal of radioactive waste according to claim 6, characterized in that the primary treated waste is of a primary treated waste complex type which is obtained by covering the primary treated waste single type with a radiation shield, the radiation shield being obtained by kneading a radiation shielding agent with water and then solidifying the resulting mixture, the radiation shielding agent being composed of the discarded pulverized seashells and the binder.

8. The method for disposal of radioactive waste according to claim 1, characterized in that the primary treated waste is a primary treated waste complex type which is obtained by covering the radioactive waste with a radiation shield, the radiation shield being obtained by kneading a radiation shielding agent with water and then solidifying the resulting mixture, the radiation shielding agent being composed of the discarded pulverized seashells and the binder.

9. The method for disposal of radioactive waste according to claim 8, characterized in that the radiation shield is a radiation shielded container.

10. The method for disposal of radioactive waste according to claim 7, characterized in that the radiation shield is a radiation shielded container.

11. The method for disposal of radioactive waste according to claim 2, characterized in that the fusing agent is boric acid, borax, or frit.

12. The method for disposal of radioactive waste according to claim 3, characterized in that the fusing agent is boric acid, borax, or frit.

13. The method for disposal of radioactive waste according to claim 2, characterized in that the glass powder is composed of lead glass or soda lime glass.

14. The method for disposal of radioactive waste according to claim 3, characterized in that the glass powder is composed of lead glass or soda lime glass.

15. The method for disposal of radioactive waste according to claim 2, characterized in that the primary treated waste is of a primary treated waste single type obtained by kneading the radiation shielding agent and a radioactive waste kneadable with the radiation shielding agent with water added thereto, and thereafter by solidifying the resulting mixture.

16. The method for disposal of radioactive waste according to claim 3, characterized in that the primary treated waste is of a primary treated waste single type obtained by kneading the radiation shielding agent and a radioactive waste kneadable with the radiation shielding agent with water added thereto, and thereafter by solidifying the resulting mixture.

17. The method for disposal of radioactive waste according to claim 15, characterized in that the primary treated waste is of a primary treated waste complex type which is obtained by covering the primary treated waste single type with a radiation shield, the radiation shield being obtained by kneading a radiation shielding agent with water and then solidifying the resulting mixture, the radiation shielding agent being composed of the discarded pulverized seashells and the binder.

18. The method for disposal of radioactive waste according to claim 16, characterized in that the primary treated waste is of a primary treated waste complex type which is obtained by covering the primary treated waste single type with a radiation shield, the radiation shield being obtained by kneading a radiation shielding agent with water and then solidifying the resulting mixture, the radiation shielding agent being composed of the discarded pulverized seashells and the binder.

19. The method for disposal of radioactive waste according to claim 2, characterized in that the primary treated waste is a primary treated waste complex type which is obtained by covering the radioactive waste with a radiation shield, the radiation shield being obtained by kneading a radiation shielding agent with water and then solidifying the resulting mixture, the radiation shielding agent being composed of the discarded pulverized seashells and the binder.

20. The method for disposal of radioactive waste according to claim 3, characterized in that the primary treated waste is a primary treated waste complex type which is obtained by covering the radioactive waste with a radiation shield, the radiation shield being obtained by kneading a radiation shielding agent with water and then solidifying the resulting mixture, the radiation shielding agent being composed of the discarded pulverized seashells and the binder.

* * * * *